Sept. 23, 1952  J. J. KEOUGH  2,611,350
COMBINED PUMP AND MOTOR CYLINDER
Filed May 23, 1950  6 Sheets-Sheet 1

Fig. 1

John J. Keough
INVENTOR.

BY *Clarence A. O'Brien*
*and Harvey B. Jacobson*
Attorneys

John J. Keough
INVENTOR.

Sept. 23, 1952 J. J. KEOUGH 2,611,350
COMBINED PUMP AND MOTOR CYLINDER
Filed May 23, 1950 6 Sheets-Sheet 4

John J. Keough
INVENTOR.

BY Clarence A. O'Brien
and Harvey B. Jacobson
Attorneys Sept. 23, 1952 J. J. KEOUGH 2,611,350
COMBINED PUMP AND MOTOR CYLINDER
Filed May 23, 1950 6 Sheets-Sheet 5

John J. Keough
INVENTOR.

Sept. 23, 1952  J. J. KEOUGH  2,611,350
COMBINED PUMP AND MOTOR CYLINDER
Filed May 23, 1950  6 Sheets-Sheet 6

John J. Keough
INVENTOR.

Patented Sept. 23, 1952

2,611,350

UNITED STATES PATENT OFFICE 2,611,350

COMBINED PUMP AND MOTOR CYLINDER

John J. Keough, Marlboro, Mass.

Application May 23, 1950, Serial No. 163,626

9 Claims. (Cl. 123—66)

This invention comprises novel and useful improvements in an internal combustion engine and more specifically pertains to an improved piston arrangement and transmission mechanism for connecting a pair of pistons in each cylinder of an internal combustion engine to a common crankshaft for effecting the customary four phases of the Otto cycle of operation of internal combustion engines upon a single revolution of the crankshaft thereof.

The primary object of this invention is to provide an internal combustion engine which embodies therein a novel arrangement of simple engine elements which shall carry out the four phases of a combustible charge intake, a compression of the charge, an ignition of the charge and the effecting of a power stroke of the pistons together with the exhausting of the products of combustion, all within a single revolution of the crankshaft of the engine.

A further important object of the invention is to provide an internal combustion engine having a cylinder and crankshaft and with a main piston connected to the crankshaft in a customary manner together with an auxiliary piston in the cylinder and cooperating with the cylinder and with the main piston in a novel manner and with an improved mechanism to perform the customary four phases of the Otto or four-cycle engine during two reciprocations of the main piston in one revolution of the crankshaft of the engine.

A still further important object of the invention is to provide an improved internal combustion engine in conformity with the preceding objects in which the compression stroke or compressing of the combustible mixture is effected in a separate chamber from that in which explosion and expansion of the charge is obtained.

Yet another important object of the invention is to provide an internal combustion engine as set forth in the foregoing objects in which an auxiliary piston is operatively connected to the connecting rod of the main piston for imparting a relative reciprocatory movement of these pistons.

And an additional object of the invention is to provide an internal combustion engine as set forth in the above mentioned objects in which an auxiliary piston is relatively movable with respect to the main piston during the reciprocation of the latter and at relative varying speeds with respect thereto in carrying out a cycle of operation.

And a final important object of the invention to be specifically enumerated herein, resides in the provision of a compact and highly efficient actuating mechanism for an auxiliary piston, which shall embody the principles of a rotating worm to effect relative reciprocatory movements between the pistons.

These, together with various ancillary features and objects of the invention, which will later become apparent as the following description proceeds, are attained by the present invention, a preferred embodiment of which has been illustrated, solely by way of example, in the accompanying drawings, wherein:

It is the primary intention of this invention to provide an internal combustion engine which shall incorporate therein all of the advantages and characteristics of a conventional four-stroke cycle operation, while completing such a cycle upon one revolution of the crankshaft.

The principles of this invention have been shown as embodied in a four-cylinder, in-line internal combustion engine, although it will be understood that the illustration is merely exemplary of the principles of the invention, and that certain aspects of the invention are capable of application in other fields than that of the internal combustion engine.

Figure 1:
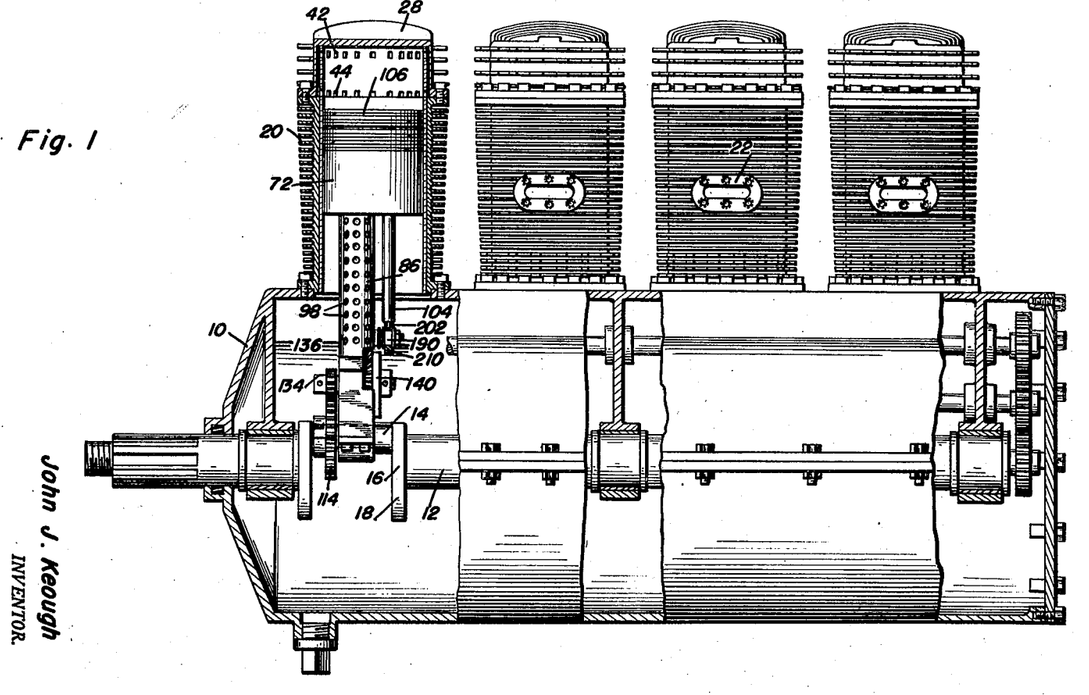
Figure 1 is a side elevational view of an internal combustion engine having a plurality of cylinders disposed in a conventional in-line arrangement, in which the principles of this invention have been incorporated, parts being broken away and parts shown in section.

Referring now more specifically to the accompanying drawings, wherein like numerals designate similar parts throughout the various views, attention is directed first primarily to Figure 1, wherein the engine chosen to illustrate one embodiment of the principles of the invention includes a crankcase 10 having a crankshaft 12 journaled therein in any suitable manner, this crankshaft having a plurality of crank throws 14 whose crank cheeks 16 are provided with the customary counter-balances or counterweights 18, it being understood that one crank throw is provided for each of the plurality of cylinders 20. While the cylinders can be of any desired construction, and the invention is not to be understood as limited to any particular cylinder arrangement, they have been shown as being of the air-cooled type and detachably secured to the crankcase 10.

Figure 1A:
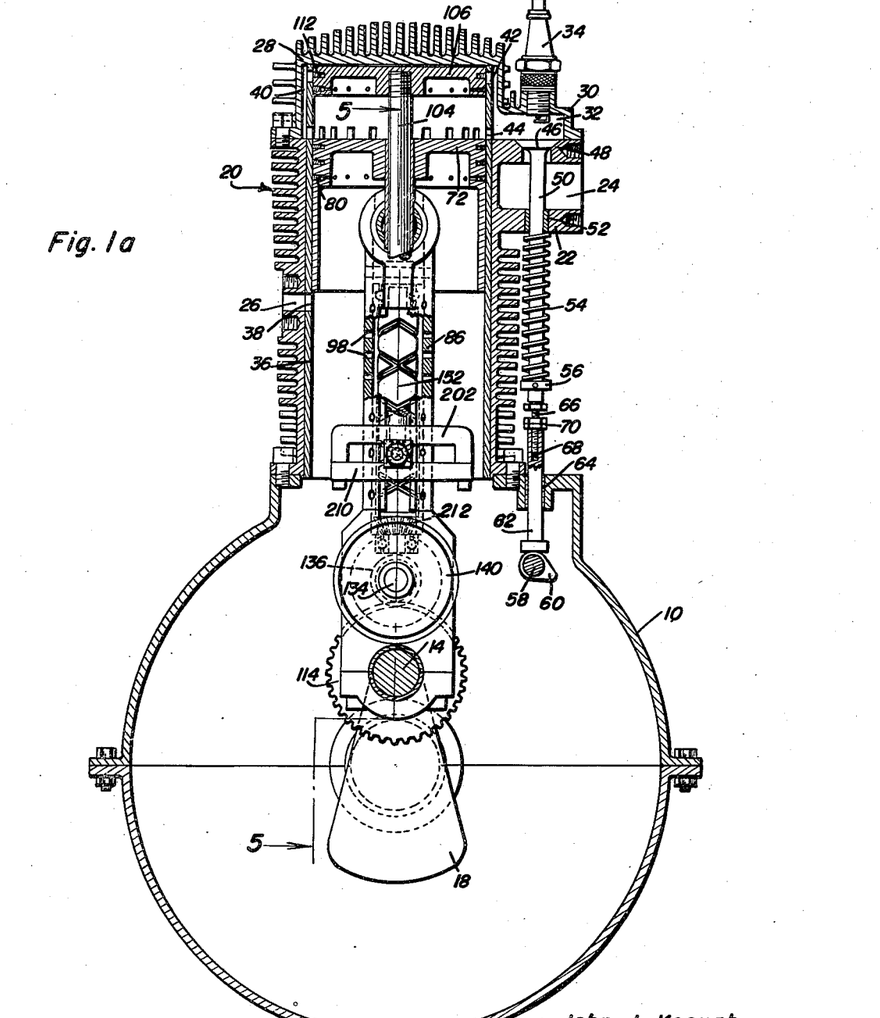
Figure 1A is a central vertical transverse sectional view through one of the cylinders of the engine shown in Figure 1, and showing upon an enlarged scale certain details of construction and arrangement of the operating mechanism for imparting a differential or relative motion to the reciprocating main and auxiliary pistons therein, the parts being shown in the position prevailing when the crank throw to which the pistons are connected is at the top of its rotation, in top dead-center position of the cylinder illustrated.

As will now be more apparent from Figure 1A, each of the cylinders is provided with a laterally extending boss 22 having an intake port 24 communicating with the interior of the cylinder, the ports 24 being adapted to be detachably connected to a common manifold for supplying a combustible mixture to the cylinders, such a fuel supplying means being of any conventional and well known design, and since the same forms in itself no part of the present invention, illustration of the same and further explanation is deemed to be unnecessary.

As shown more clearly in Figure 1A, the cylinder 20 is provided intermediate its extremities with a conventional exhaust port 26, and this cylinder is further provided with a detachable cylinder head 28 in which is provided a laterally offset portion 30 adapted to overlie and be joined to the projection 22, to provide an ignition chamber 32 into which extends a conventional form of spark plug or other ignition device 34.

Removably secured in the cylinder 20 in any desired manner, is a cylinder sleeve or liner 36, which is open at both its upper and lower extremities, and is provided with an exhaust aperture or port 38 adapted to register with the port 26 in the cylinder 20. The upper end of the sleeve or liner 36 extends above the upper surface of the cylinder 20, and into a chamber 40 which is formed in the cylinder head 28.

As shown clearly in Figure 1A, the upper extending portion of the sleeve or liner 36 is spaced from the walls of the chamber 40 to provide an annular space therein about the upper end of the sleeve or liner, this annular space being in free and continuous communication with the ignition chamber 32. The extreme upper end of the sleeve 36 may contact the upper wall of the chamber 40, but preferably is slightly spaced therefrom in order to insure that sufficient clearance shall exist to permit the cylinder head 28 to be tightly secured to the cylinder 20.

Extending through the upper end of the sleeve 36 is a row of ports or passages 42 which connect the interior of the sleeve or liner with the annular space in the chamber 40, while a second row of ports or passages 44 extends through the upper end of the sleeve 36 just above the upper surface of the cylinder 20.

Any conventional intake valve mechanism can be provided, the invention not being limited in its advantages to any specific arrangement. However, as illustrated in Figure 1A, a conventional form of poppet valve 46 is adapted to seat upon the valve seat 48 forming the upper wall of the projection 22 and communicating with the ignition chamber 32. The valve stem 50 being slidably received in a suitable guide bushing 52 and being encircled by a compression spring 54 whose upper end abuts against the lower surface of the projection 22 and whose lower end is retained upon the valve stem as by a conventional form of removable valve retainer washer 56. The spring 54 thus yieldingly urges the valve into its closed position.

A conventional valve actuating cam shaft 58 is suitably journaled in the crank case 10 and is provided with the customary valve actuating cams 60 which periodically raise the valve tappet 62 slidable in a guide bushing 64 formed in the upper end of the crankcase 10, this tappet having the customary clearance adjusting screw 66 screw-threadedly engaged in a threaded bore 68 in the upper end of the tappet 62 and retained in longitudinally adjusted position as by means of lock nuts 70. From the foregoing it will be apparent that the intake valve 30 thus opens or closes the communication between the intake port 22 and the ignition chamber 32 in properly timed relation to the position of the pistons in the engine.

Figures 5, 8, 9, 10:
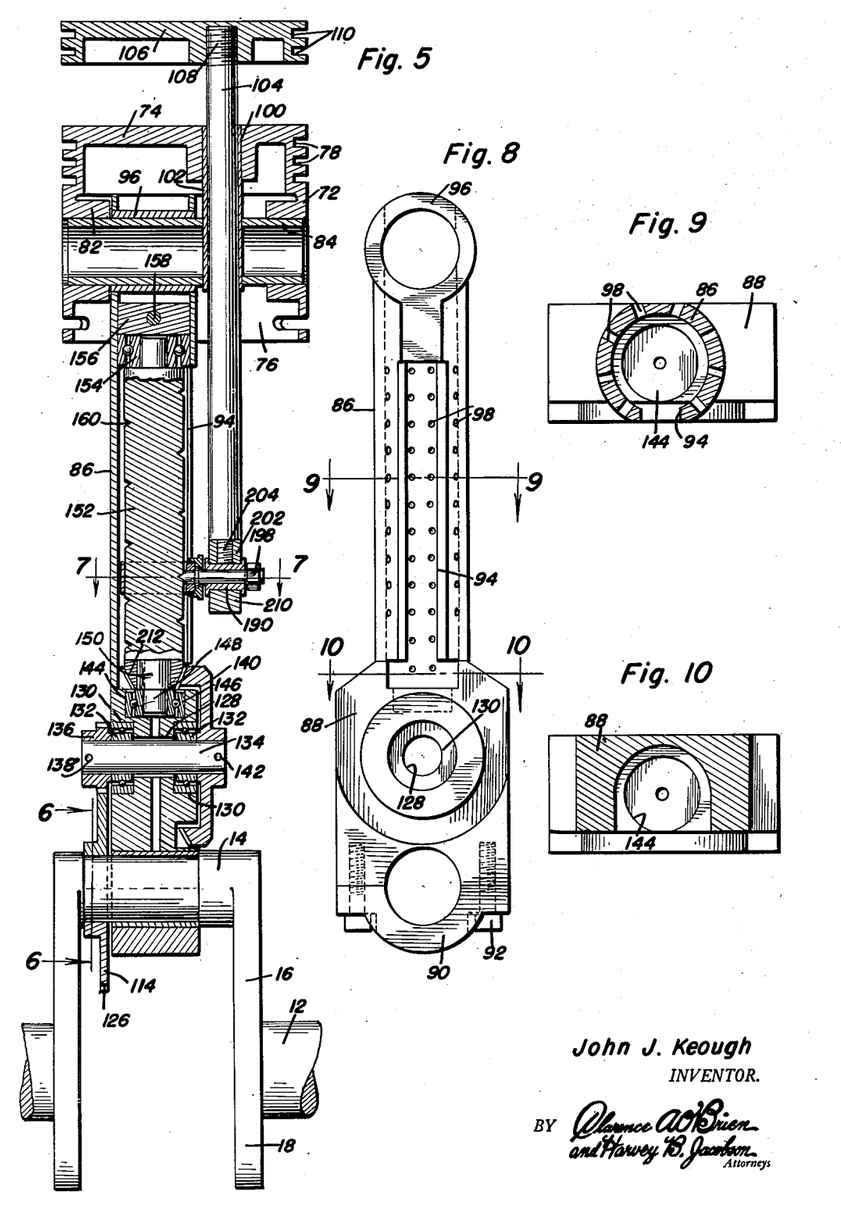
Figure 5 is a vertical longitudinal sectional view taken at right angles to Figure 1A and upon a somewhat enlarged scale of the main auxiliary pistons, the crank throw to which they are attached and the operative connection between the piston.
Figure 8 is a side elevational view of the main connecting rod, the same being shown with the connecting rod cap in place and the worm and gearing removed from the rod.
Figure 9 is a horizontal sectional detail view taken substantially upon the plane indicated by the section line 9—9 of Figure 8.
Figure 10 is a further horizontal sectional detail taken substantially upon the plane indicated by the section line 10—10 of Figure 8.

Reference is now made chiefly to Figure 5 for an explanation and understanding of the piston assembly for each of the cylinders 20, and the operating mechanism connecting the piston assembly together and to the crankshaft 12.

A main piston 72 is provided having a piston head 74 and a skirt portion or apron 76, this piston being provided with the customary grooves or annular channels 78 for receiving piston rings 80, as shown in Figure 1A, these piston rings being of a conventional design.

The piston is provided with the customary diametrically disposed tubular bosses for receiving a wrist pin 84 therethrough, this wrist pin comprising a pivotal connection for the upper end of a connecting rod 86.

At its lower end, the piston rod is provided with an enlarged portion 88 forming the upper half of a connecting rod bearing which seats upon the crank throw 14, a removable connecting rod bearing cap 90 being attached to the end 88 as by bolts 92 for journaling and securing the lower end of the connecting rod to the crank throw.

As will be readily apparent from Figures 5, 7—10, the connecting rod 86 is of tubular construction, being provided upon one side with a longitudinally extending slot 94 forming a guideway as set forth hereinafter.

At its upper end, the tubular connecting rod 86 is provided with an annular hub or eye portion 96 by means of which the connecting rod is journaled upon the wrist pin 84. As shown clearly in Figure 8, the tubular connecting rod 86 may be suitably apertured throughout its length in order to reduce weight and conserve material, as well as to facilitate the access of the lubricant to the interior of the rod and to the operating mechanism housed therein, these apertures being indicated by the numeral 98.

The head 74 of the main piston 72 is provided with an eccentrically located vertically disposed aperture 100 through which extends a guide bushing or sleeve 102 in which is journaled a piston rod 104 of the auxiliary piston 106. The latter is slidingly and reciprocatingly received in the cylinder sleeve or liner 36 above the main piston 72, and is detachably secured to the upper end of the auxiliary piston rod 104 as by a screw-threaded engagement with the threads 108 on said rod. The auxiliary piston is likewise provided with piston ring grooves 110 for the reception of the piston rings 112, as shown in Figure 1A.

It will thus be seen that the auxiliary piston is journaled upon the main piston for vertical guided sliding movement relative thereto through the rigid auxiliary piston rod 104. At its lower extremity, this auxiliary piston rod is operatively connected with the crank throw 14 by an operating mechanism for imparting movement to the auxiliary piston in timed relation relative to the conventional reciprocation of the main piston.

This operating mechanism for the auxiliary piston which forms a novel construction in accordance with the present invention, will now be more clearly understood by particular reference to Figures 1A, 5, 6, 7, 11—16.

Figure 6:
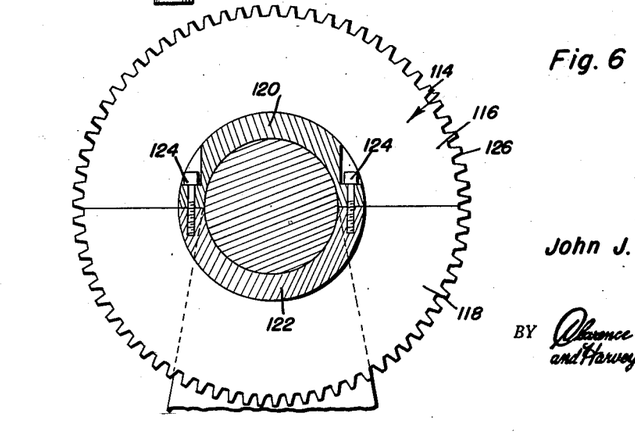
Figure 6 is a vertical transverse sectional detail view taken substantially upon the plane indicated by the section line 6—6 of Figure 5 of the primary driving gear of the piston operating mechanism.

As shown more clearly in Figures 5 and 6, the crank throw 14 has fixedly and rigidly but removably secured thereto in side by side relation to the pivotal connection of the connecting rod 86, a driving gear 114, the latter consisting of a pair of complementary sections 116 and 118 having integral complementary hub portions 120 and 122, the latter serving to clamp upon and embrace the crank throw 14, and be fixedly but removably secured thereto as by fastening bolts or the like 124. The two sections 116, 118 thus provide a continuous driving gear having teeth 126.

The enlarged end portion 88 of the connecting rod 86 has a transverse bore or passage 128 extending therethrough, this passage having diametrically enlarged recesses 130 at its extremities, anti-friction bearings 132 being received in these recesses. By means of these bearings, a shaft 134 is rotatably journaled in the enlarged end 88, one end of this shaft having a gear 136 attached thereto as by a pin or the like 138, the gear meshing with the previously mentioned driving gear 114. While it is evident that the ratio of the gears 114 and 136 will vary with the specific application to which the present invention is to be put, a ratio of three to one, causing three rotations of the shaft 134 to one rotation of the crank throw 14 is found to be satisfactory.

At its other end, the shaft 134 has secured thereto a beveled ring gear 140 as by means of a fastening pin 142, this ring gear thus rotating likewise at three times the speed of rotation of the crank throw 14.

In order to render the construction more compact, the phase or side of the enlarged portion 88 which is adjacent to the beveled gear 140 is cut away to provide clearance for the annular toothed flange of the beveled gear. The upper surface of the enlarged portion 88 is provided with a longitudinally extending recess or bore 144 which communicates with the hollow interior of the tubular connecting rod 86, this bore serving to receive a bearing assembly 146 in which is journaled the diametrically reduced lower axial extension 148 of an elongated cylindrical shaft 150 having a cylindrical drum 152 thereon constituting a worm and so referred to hereinafter.

The upper end of the cylinder 150 is journaled in a bearing assembly 154 which is received in the upper end of the tubular connecting rod 86, this bearing 154 being retained upon the end of the cylinder 150 by means of a block 156 disposed in the tubular connecting rod and retained as by a fastening pin 158. It will thus be seen that the cylinder 150 and the worm 152 thereon are rotatably journaled within the hollow connecting rod 86.

Figures 11, 12, 13:
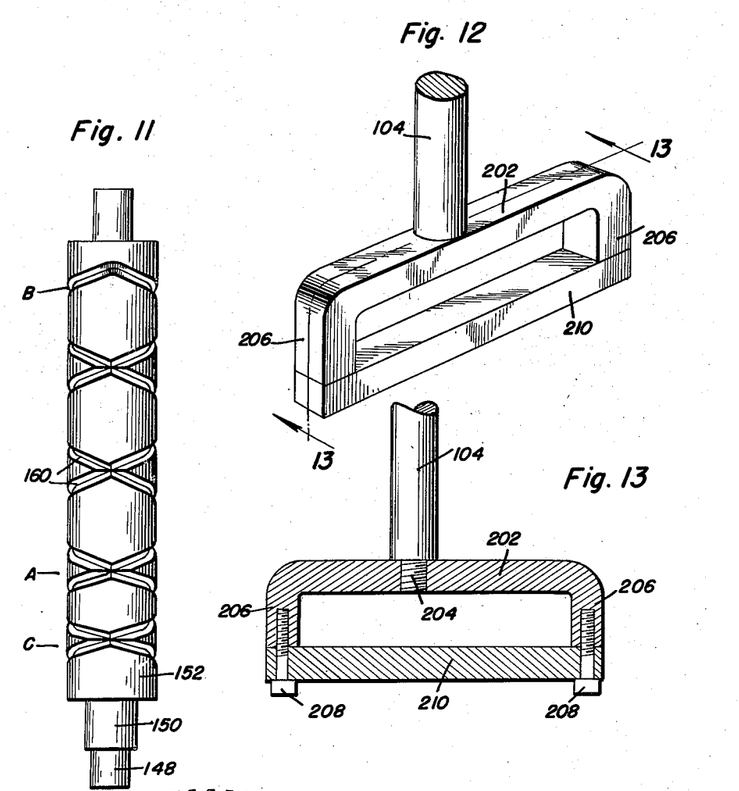
Figure 11 is a perspective view of a worm forming a part of the operative connection between the connecting rods of the two pistons.
Figure 12 is a perspective view of a yoke forming a part of the operative connection between the pistons.
Figure 13 is a vertical longitudinal sectional view taken substantially upon the plane indicated by the section line 13—13 of Figure 12 and showing further structural details of the yoke thereof.

The worm 152 is provided with a continuous screw thread or cam groove 160 extending circumferentially and longitudinally of the worm as shown clearly in Figure 11.

As will be readily apparent, the pitch or axial travel of the groove 160 will be proportioned and designed to give any desired relative speed of travel of a follower upon the worm. The auxiliary piston rod 104 is operatively connected to this worm for effecting a relative longitudinal reciprocatory movement of the auxiliary piston rod with respect to the main piston rod 86 and the worm which is journaled therein. This operative connection preferably comprises the construction disclosed more specifically in Figures 7, 14—16.

Figures 7, 14, 15, 16:
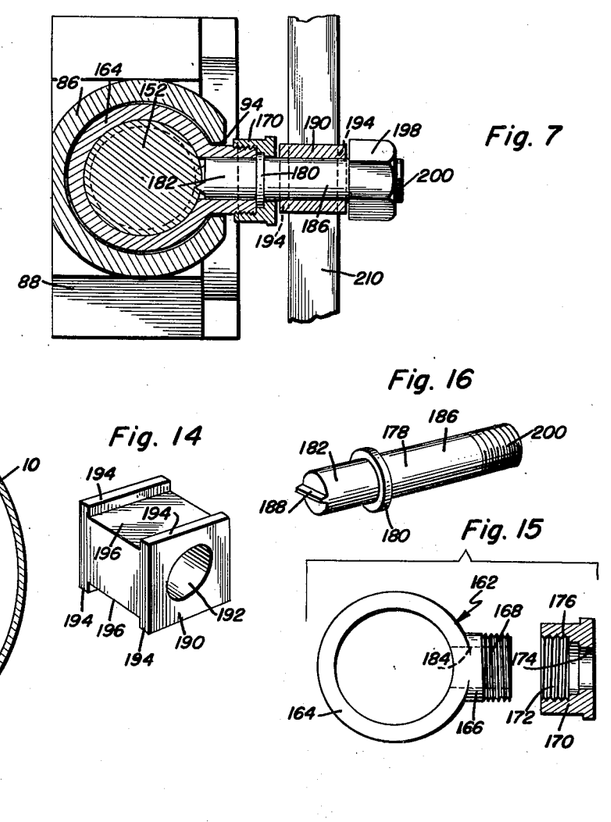
Figure 7 is a horizontal sectional detail view taken substantially upon the plane indicated by the section line 7—7 of Figure 5, and showing the manner in which the operating mechanism of the auxiliary piston is operatively connected with the connecting rod of the main piston.
Figure 14 is a perspective view of a slide block forming a part of the yoke assembly.
Figure 15 is a group assembly view, parts being shown in section, of the cam follower holder forming a part of the operative connection between the two piston rods.
Figure 16 is a perspective view of the cam follower.

A carriage indicated generally by the numeral 162 is provided, the same consisting of an annulus or eye 164 adapted to loosely and slidably embrace the worm 152 for travel longitudinally thereof, the carriage further having an integral tubular lateral extension 166 adapted to extend through and be slidably received for longitudinal movement in the slot 94 in the tubular connecting rod 86. The extremity of the extension 166 is externally screw-threaded as at 168 for the detachable reception of a nut 170, which is internally threaded as at 172, is apertured as at 174 and is internally shouldered as at 176.

A follower is provided for sliding engagement in the worm groove 160, this follower comprising a cylindrical body in the form of a rod or the like as at 178, this rod having an annular rib or shoulder 180 intermediate its ends. By means of the shoulder 180, the cylindrical member 178 is divided into an inner portion 182 which is rotatably journaled in the tubular bore 184 of the extension 166 of the carriage, and a portion 186 which extends through the aperture 174 in the nut 170. At its inner extremity, the portion 182 is provided with a diametrically extending axial key or rib 188 which is adapted to engage in the worm groove 160 for travel throughout the length of this continuous groove. As will be apparent from Figure 7, the eye of the carriage is retained upon the worm for longitudinal sliding movement therealong, with the rib 188 traveling in the cam groove 160, and with the follower 178 being rotatably retained upon the carriage by the journaling engagement of the portion 182 in the bore 184, and by the shoulder 176 engaging the flange or rib 180 and clamping the latter against the outer surface of the projection 166.

Rotatably journaled upon that portion 186 of the follower 178 which extends beyond the nut 170, is a journal block 190, having a bore 192 through which is journaled the portion 186, and having upon two opposite faces pairs of laterally spaced guide and retaining flanges 194, defining a pair of guide or slide surfaces 196 therebetween. The journal block 190 is retained upon the portion 186 as by means of a fastening bolt 198 threaded upon the screw-threaded extremity 200 of the follower 178.

At its lower extremity, the previously mentioned auxiliary piston rod 104 is provided with a laterally extending yoke 202 which is secured to the piston rod as by detachable engagement with the screw-threaded extremity 200 thereof, see Figure 13. The two arms 206 of the yoke 202, have detachably secured thereon as by fastening bolts 208, a cap or retainer bar 210. The journal block 190 is received within the yoke, the bearing surface 196 thereof being respectively engaged with the adjacent surfaces of the yoke 202 and the retainer bar 210, whereby the journal bearing is slidable transversely of the yoke, as will be readily apparent by a comparison of the showing of these parts in Figures 1A, 2—4.

Referring now again to Figure 5, it will be seen that there is secured or attached to the cylinder 150, immediately above the reduced portion 148 thereof, a bevel gear 212 which is continuously in mesh with the gear teeth of the gear 140. While the actual ratio between the gears 140 and 212 may be varied in accordance with the particular construction of mechanism utilized, in the arrangement shown the gear 140 has a ratio with respect to the gear 212 of three to one, so that for each revolution of the gear 140 and its shaft 134, the worm is given three revolutions.

It will now be apparent that for each revolution of the crank throw 14 in the embodiment illustrated, the worm 152 is given nine revolutions for a purpose to be now apparent.

From a further inspection of the drawings, it will be seen that the auxiliary and main pistons in each of the cylinders defines a space above the upper surface of the auxiliary piston and below the top wall of the chamber 40 in the cylinder head 28 which constitutes a compression chamber, indicated by the numeral 220 while the space between the main and auxiliary pistons constitutes a combustion chamber 222. The two sets of ports 42 and 44 in conjunction with the annular space between the upper extension of the sleeve 36 and the wall of the chamber 40, constitute a bypass from the top side of the auxiliary piston, or the compression chamber, to the lower side of the auxiliary piston or to the combustion chamber as will be readily understood from a comparison of the various piston positions illustrated.

As a prelude to understanding the complex operation of the main and auxiliary pistons, it should be observed that the main piston reciprocates in harmonic motion in response to the uniform rate of rotation of the crank throw 14, while the auxiliary piston has a controlled and timed reciprocation relative to the main piston which varies considerably throughout a complete cycle of actuation of the main piston. However, the relative movements of the two pistons within the cylinder are such as to first induct a charge into the compression chamber 220 through the intake port 24, the intake valve 46, the ignition chamber 32, and the chamber 40 and apertures 42 and 44 when the auxiliary piston has moved downwardly below the ports 42 and/or 44, owing to the position shown in Figures 3 and 4.

Figure 2:
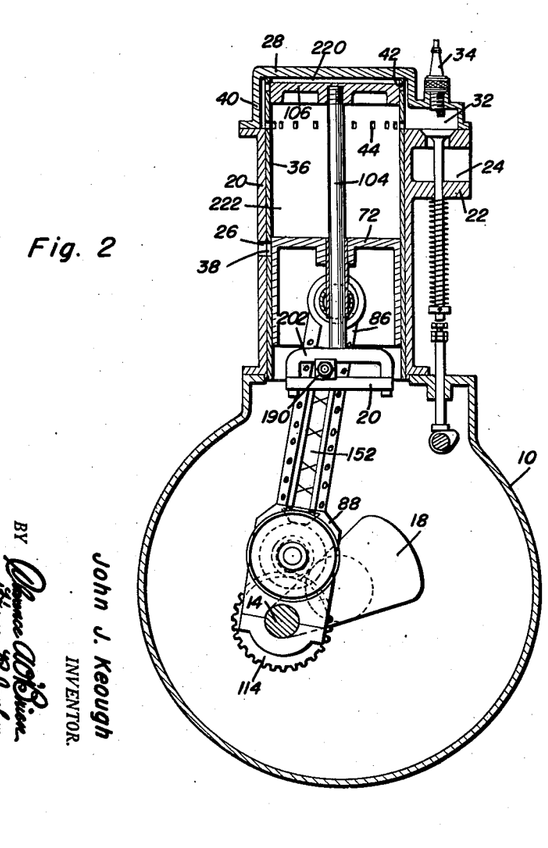
Figures 2–4 are diagrammatic views similar to the showing of Figure 1A, and respectively illustrating the position of the parts in positions of the crankshaft at 120 degrees, 180 degrees and 240 degrees after top dead-center position as shown in Figure 1A.

Upon the up-stroke of the auxiliary piston relative to the cylinder, the charge inducted into the combustion chamber 220 is compressed, until such time as the lower edge of the auxiliary piston moves above and uncovers the ports 44, as shown in Figures 1A and 2, at which time the compression chamber can pass by means of the ports 42, 44 and the annular chamber surrounding the upper extension of the sleeve 36, into the combustion chamber 222 between the pistons. This position is substantially that shown in Figure 1A.

Figure 3:
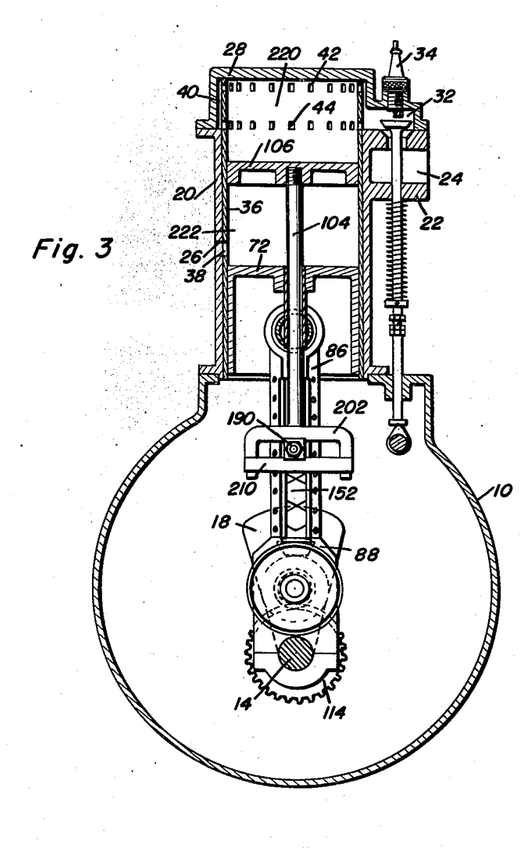

Upon initiation of combustion in the combustion chamber by the spark plug 34 in the customary manner, the pressure of the explosion will cause a relative separation of the two pistons, the downward movement of the main piston serving to transmit the power of this explosion to the crankshaft in the customary manner. When the downward travel of the main uncovers the exhaust ports 36 and 38, the products of combustion may escape, and are effectively and substantially completely expelled from the combustion chamber by the approach of the two pistons toward each other, the combustion chamber being in communication with the exhaust ports as shown in Figure 3.

It is obvious that by properly designing the worm grooves 160 and properly proportioning the ratio of the gear assemblies connecting the worm with the crank throw, that any desired variable rate of travel may be imparted to the auxiliary piston with respect to the substantially uniform rate of travel of the main piston.

In the arrangement shown, the 9 to 1 gearing ratio between the rotation of the crank throw 14 and of the worm 152 is utilized to effect the four phases of intake, compression, power stroke and exhaust by the relative movement between the variably moving auxiliary piston and the uniformly moving main piston in the course of one revolution of the crank shaft or two strokes, one in stroke and one out stroke, of the main piston.

The worm groove or thread 160, as disclosed in Figure 11, is of an irregular pitch or lead, in order to vary the rate of piston travel of the auxiliary piston throughout different portions of its cycle of operation. Thus, between the points A and B, three uniform threads of the groove are provided, which in the engine illustrated will be of a one inch pitch, making a total travel of three inches of the follower in the cam groove for three revolutions of the worm. However, that portion of the thread lying between the points A and C will be of a lesser pitch, there being 1½ threads to the inch, to produce the following operation.

When the crank throw is at its uppermost position in its path of travel, as shown in Figure 1A, both of the pistons will be at its highest position in the cylinder, this being the position of the parts at the instant of the ignition of combustion and at the beginning of the power stroke. At this time the compressed charge of the compression chamber 220 has been discharged by way of the previously mentioned parts into the combustion chamber, and at this time the follower is at the point A upon the worm, that is, at the lowermost of the three threads of one inch pitch. When the explosion has then occurred, the expanding gases acting upon the piston head 74 of the main piston drive the latter downwardly and through the connecting rod assemblies which directly connect the main piston with the crankshaft, impart a counter-clockwise rotation to the crankshaft as viewed in Figure 1A, thus producing an expansion of the combustion chamber. This phase of the operation lasts throughout 120 degrees of rotation of the crankshaft, until the position shown in Figure 2 has been attained. During this time, the auxiliary piston has been maintained in a stationary position or substantially stationary position closely adjacent the top of the cylinder, and this effect is obtained by so proportioning the pitch of the worm threads from the points A to B as to cause the follower to move upwardly along the worm at the same rate at which the latter moves downwardly with the main connecting rod during the travel of the crankshaft.

It will be noted that in traveling from the position of Figure 1A to that of Figure 2, the crankshaft has moved through 120 degrees or one-third of its rotation, and consequently by virtue of the three to one gearing ratio between the fixed gear 114 and the driven gear 136, the shaft 134 has made one complete revolution, and in turn by reason of the three to one ratio between gears 140 and 212, the worm 152 has been given three complete revolutions. Thus, the follower has moved along three complete turns of the thread 160, or from the point A to the point B which is the topmost position upon the worm. This travel completes the power stroke of the engine, the main piston being now in position to uncover the exhaust ports 36, 38, as will be apparent from Figure 2.

Figure 4:
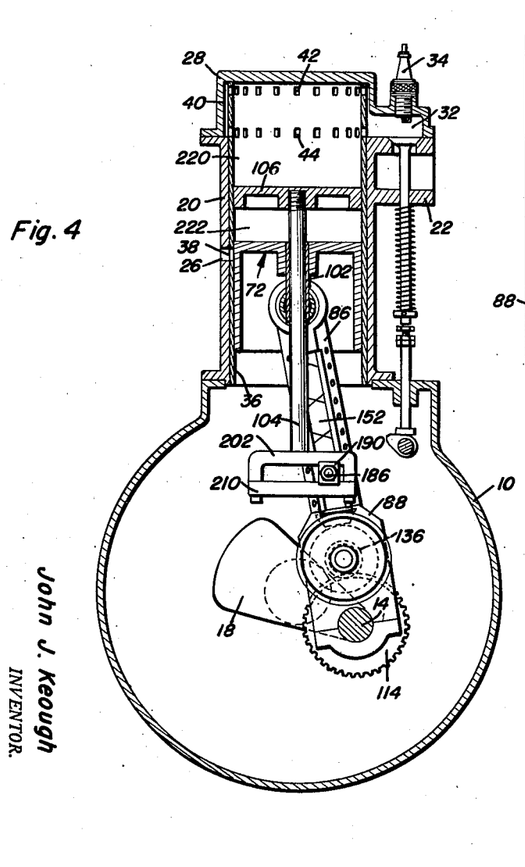

Upon continued counter-clockwise rotation of the crankshaft, the main piston now uncovers the exhaust port thus permitting escape of the combustion pressure, and at this time continued rotation of the worm 152 begins to cause a reverse movement of the follower along the same, thus drawing the auxiliary piston downwardly toward the main piston, Figure 3 illustrating the intermediate portion of this phase of operation, and the position which the parts assume when the main piston as it is at its bottom dead-center position or at 180 degrees of rotation of the crankshaft. It will be noted that in this position the approach of the auxiliary piston to the main piston has served to reduce the clearance between these two pistons thus positively expelling some exhaust gases from the combustion chamber, and has expanded the compression chamber 220 causing an intake or induction of charge past the intake valve. During this phase of the operation, the travel of the parts continues until the position shown in Figure 4 is attained, this being the position at 240 degrees of rotation of the crankshaft. Just prior to the reaching of the position in Figure 4, the converging travel of the two pistons has substantially completely expelled the combustion products from the combustion chamber, and the ascending main piston has passed the exhaust ports 36, 38, thus terminating the exhaust stroke.

In the position shown in Figure 4, the cam follower has moved from the topmost position upon the worm as shown in Figure 2, back to the normal position at the point A, as shown in Figures 1A and 4.

It will be now noted that three turns of the worm were necessary for the follower to reach the top of the worm, to the position shown in Figure 2; three more turns for it to return to its original position at the point A as shown in Figure 4; and three additional turns will now be necessary to cause the follower to move from the point A to the point C and back to the point A, at a different rate of travel, in order to complete the entire cycle of operation.

From the position of Figure 2 at 240 degrees of the crankshaft rotation, the main piston continues to ascend, and the auxiliary piston remains substantially stationary, as the follower descends to the point C upon the worm, at which time the two pistons reach their closest position with respect to each other. Upon the final portion of the crankshaft rotation, the two pistons begin to separate as the follower moves up from the point C to the point A upon the worm, so that the two pistons arrive back in the position shown in Figure 1A with the inducted charge of the compression chamber compressed and by-passed through the combustion chamber ready for the next explosion therein.

It will thus be observed that the four phases common to the Otto cycle, the induction of a charge, the compression of a charge, the combustion and the exhaust of a charge have all been effected in one rotation of the crankshaft by means of a uniformly reciprocating main piston and a variably reciprocating auxiliary piston.

From the foregoing, it is thought that the construction and operation of the device together with its many advantages will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modification and equivalents may be resorted to, falling within the scope of the appended claims.

Having described the invention, what is claimed as new is:

1. An internal combustion engine comprising a cylinder, main and auxiliary pistons slidable therein, a crankshaft, a piston rod assembly connecting said main piston to said crankshaft, operating means connecting said auxiliary piston to said main piston for relative movement, a worm drive operable upon rotation of said crankshaft for actuating said operating means, a cross head slidably mounted upon said piston rod assembly, said worm drive being reversible and operatively connected to said cross head.

2. An internal combustion engine comprising a cylinder, main and auxiliary pistons slidable therein, a crankshaft, a piston rod assembly connecting said main piston to said crankshaft, operating means connecting said auxiliary piston to said main piston for relative movement, a worm drive operable upon rotation of said crankshaft for actuating said operating means, said worm drive including a worm having an axis of rotation within the cylinder and rotatably journaled on said piston rod assembly.

3. An internal combustion engine comprising a cylinder, main and auxiliary pistons slidable therein, a crankshaft, a piston rod assembly connecting said main piston to said crankshaft, operating means connecting said auxiliary piston to said main piston for relative movement, a worm drive operable upon rotation of said crankshaft for actuating said operating means, said worm drive including a worm having an axis of rotation within the cylinder and rotatably journaled on said piston rod assembly, a worm follower slidable axially of said worm, said follower constituting part of said operating means.

4. An internal combustion engine comprising a cylinder, main and auxiliary pistons slidable therein, a crankshaft, a piston rod assembly connecting said main piston to said crankshaft, operating means connecting said auxiliary piston to said main piston for relative movement, a worm drive operable upon rotation of said crankshaft for actuating said operating means, said worm drive including a worm journaled on said piston rod assembly, a worm follower slidable axially of said worm, said follower constituting part of said operating means, said piston rod assembly comprising a hollow piston rod, said worm and follower being mounted in said piston rod, a slot in said piston rod, said follower extending through said slot.

5. An internal combustion engine comprising a cylinder, main and auxiliary pistons slidable therein, a crankshaft, a piston rod assembly connecting said main piston to said crankshaft, operating means connecting said auxiliary piston to said main piston for relative movement, a worm drive operable upon rotation of said crankshaft for actuating said operating means, said worm having threads of varying pitch for imparting varying relative speeds to said auxiliary piston.

6. An internal combustion engine comprising a cylinder, main and auxiliary pistons slidable therein, a crankshaft, a piston rod assembly connecting said main piston to said crankshaft, operating means connecting said auxiliary piston to said main piston for relative movement, a worm drive operable upon rotation of said crankshaft for actuating said operating means, said worm having threads of varying pitch for imparting varying relative speeds to said auxiliary piston, said operating means causing movement of said pistons in said cylinder to effect intake, compression, power and exhaust phases in said cylinder during one rotation of said crankshaft.

7. An internal combustion engine comprising a cylinder, main and auxiliary pistons slidable therein, a crankshaft, a piston rod assembly including a tubular connecting rod connecting said main piston to said crankshaft, operating means connecting said auxiliary piston to said main piston for relative movement, a worm drive including a worm journaled in said connecting rod and operable upon rotation of said crankshaft for actuating said operating means, said operating means causing movement of said pistons in said cylinder to effect intake, compression, power and exhaust phases in said cylinder during one rotation of said crankshaft.

8. An internal combustion engine comprising a cylinder, main and auxiliary pistons therein, a crankshaft, a connecting rod connecting said main piston to said crankshaft, a piston rod slidably connecting said auxiliary piston to said main piston, a worm journaled on said connecting rod, a follower operatively connecting said worm to said piston rod, gearing connecting said worm to said crankshaft.

9. An internal combustion engine comprising a cylinder, main and auxiliary pistons therein, a crankshaft, a connecting rod connecting said main piston to said crankshaft, a piston rod slidably connecting said auxiliary piston to said main piston, a worm journaled on said connecting rod, a follower operatively connecting said worm to said piston rod, gearing connecting said worm to said crankshaft, said follower comprising a carriage movable longitudinally of said worm, guide means preventing rotation of said follower relative to said connecting rod.

JOHN J. KEOUGH.

REFERENCES CITED

The following references are of record in the file of this patent:

UNITED STATES PATENTS

| Number | Name | Date |
|---|---|---|
| 491,403 | Biggar | Feb. 7, 1893 |
| 821,370 | Morrison | May 22, 1906 |
| 1,186,350 | Wagner | June 6, 1916 |
| 1,326,733 | Hulse | Dec. 30, 1919 |
| 1,439,958 | Gile | Dec. 26, 1922 |
| 1,740,040 | Sapienza | Dec. 17, 1929 |
| 1,876,506 | Lee | Sept. 6, 1932 |
| 2,222,367 | Keough | Nov. 19, 1940 |